United States Patent [19]
Rachner

[11] Patent Number: 4,753,677
[45] Date of Patent: Jun. 28, 1988

[54] PROCESS AND APPARATUS FOR PRODUCING STEEL FROM SCRAP

[75] Inventor: Hans-Günther Rachner, Essen, Fed. Rep. of Germany

[73] Assignee: Dr. Kuttner, GmbH & Co. KG, Essen, Fed. Rep. of Germany

[21] Appl. No.: 747,832

[22] Filed: Jun. 24, 1985

[30] Foreign Application Priority Data

Jun. 23, 1984 [DE] Fed. Rep. of Germany ....... 3423247

[51] Int. Cl.[4] .......................... C21C 1/00; F27D 17/00
[52] U.S. Cl. .................................... 75/59.18; 266/144; 266/900
[58] Field of Search ....................... 266/144, 900, 217; 75/43, 44 R, 44 S, 59.18, 46

[56] References Cited

U.S. PATENT DOCUMENTS

| | | | |
|---|---|---|---|
| 3,424,573 | 1/1969 | De Villiérs | 266/900 |
| 4,309,024 | 1/1982 | Lillybeck et al. | 266/900 |
| 4,605,437 | 8/1986 | Sugiura et al. | 266/144 |

Primary Examiner—Melvyn J. Andrews
Attorney, Agent, or Firm—Wegner & Bretschneider

[57] ABSTRACT

A process and apparatus for producing steel from scrap. A cupola furnace is provided with a layer of coke in the vicinity of the tuyeres of the furnace, with scrap to be melted being supplied upstream of the layer of coke and molten scrap passing through the layer of coke to a converter located downstream of the furnace. The molten scrap is refined in the converter with oxygen, thereby producing a CO-rich converted waste gas, which is supplied to the coke layer and burned in the vicinity of the tuyeres.

12 Claims, 1 Drawing Sheet

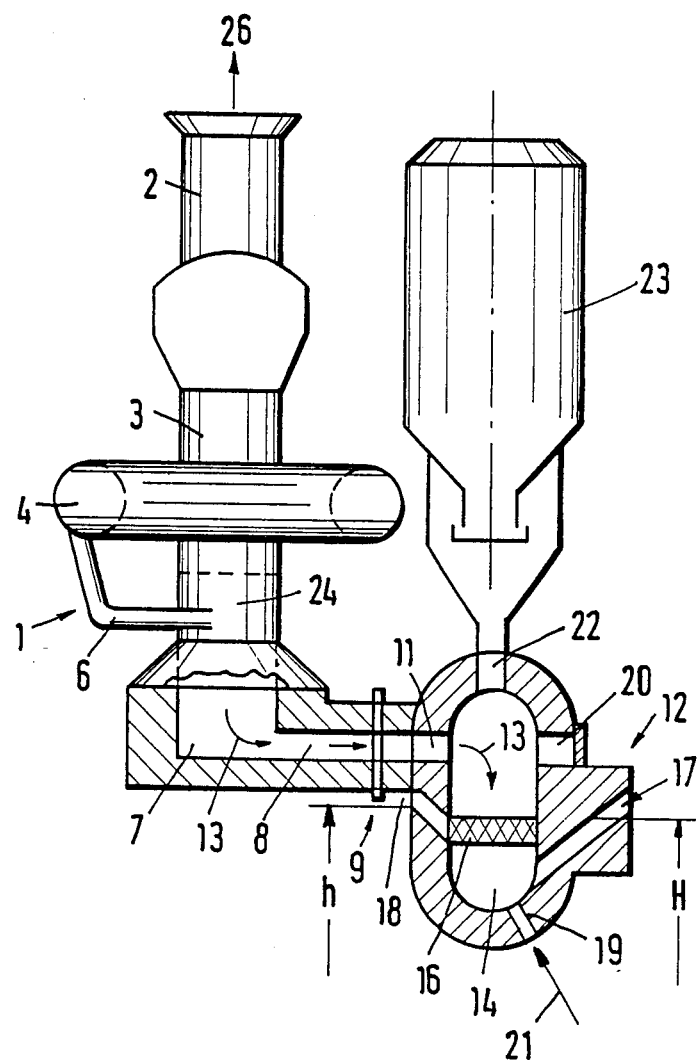

PROCESS AND APPARATUS FOR PRODUCING STEEL FROM SCRAP

The invention relates to a process for producing steel from scrap using a cupola furnace for melting the pig iron, in which a coke layer is formed between the scrap to be processed and the molten pig iron and tuyeres for supplying oxygen to the cupola furnace issue into the vicinity of the coke layer, and whilst using a converter positioned downstream of the cupola furnace in which the molten pig iron is refined by supplying oxygen.

The invention also relates to an apparatus for producing steel from scrap with a cupola furnace, whose tuyeres supplying oxygen thereto issue in the vicinity of a coke layer formed in its lower section and with a converter positioned downstream of the cupola furnace, in which the pig iron melted in the cupola furnace is refined by the introduction of oxygen.

Hitherto, mainly electric arc furnaces have been used for producing steel from scrap (particularly in the smaller steel mills). This technology has become highly developed and consequently is satisfactory, particularly for the production of special steels, but this does not apply to the energy balance and consequently to the costs to be expended for the necessary energy use. Over the past few years, these costs have increased considerably as a result of rising energy costs. In addition, it is not very sensible to produce thermal electric power consuming petroleum to use it for steel production. A further reason for the considerable cost increase in connection with electric steel production is that the necessary equipment for cleaning the furnace waste gases, as well as the equipment for reducing the high operating noises involve high investment costs and this is reflected in the operating costs.

Thus, in individual cases, there has already been a tendency to move away from electric steel production with arc furnaces and various processes with 100% steel use have been proposed and in part have already been put into operation, in which solid, liquid or gaseous fuels are used as energy carriers, preference being given to working with coal, coke, and oxygen.

Thus, e.g. in a known procedure for producing steel with the use of steel scrap only, a converter is used, through whose bottom finely ground coal, together with oxygen is blown into the steel bath by means of two concentric nozzles.

In another known process, which aims at producing steel with better heat utilization and permits a procedure with high steel use, pig iron is initially loaded into a converter and oxygen is blown into the pig iron bath through a horizontally positioned lance, the gas produced and passing out of the pig iron bath being burnt in the converter, so that it firstly heats the converter or the converer content and secondly the resulting flue gas preheats the steel scrap located in a shaft over the converter (DE-A-32 19 984). The quantity of steel scrap added to the pig iron can be increased by the sensible heat introduced into the converter and a further scrap quantity increase can be obtained if additional heat is introduced into the converter with additional burners. Still unburnt residual constituents of combustible gases (CO) in the converter waste gas are subsequently burned in the shaft containing the scrap to be preheated (and optionally coal) by the supply of oxygen or air for improving the scrap preheating. The still lumpy scrap is preheated to the maximum extent in this way and is pushed by means of a slide member or a screw conveyor through the connection of the shaft to the converter into the latter.

In the case of such a steel production using scrap with preceding scrap preheating an optimum thermal utilization of the heat formed during the process cannot take place, because the heat absorption of the scrap is limited. Thus, if a high scrap preheating takes place in the shaft, particularly in the case of relatively thin scrap lumps, this necessarily leads to a fusion or initial melting and consequently to a blocking of the shaft and/or the connecting part to the converter optionally following the shaft. However, the intended introduction of the preheated scrap from the shaft into the converter by means of a slide or the like is no longer possible. In extreme cases, the gas removal from the converter to the shaft can be prevented.

Thus, this known process is only possible for selected special scrap of considerable thickness, or in the case of pigs, at preheating temperatures up to max. approx. 500° to 600° C., not for steel production from unsorted, random scrap, which generally also contains a considerable proportion of smaller or thinner lumps.

In a further known process, in a cupola furnace operating at up to 100% steel scrap use, pig iron is produced, which is transferred from the cupola furnace into a separate converter, where it is refined. However, this process operates with separate waste gas economies for the cupola furnace on the one hand and the converter on the other. Independently of the cupola furnace gas, the converter waste gas is burnt, purified, etc., so that, as in the aforementioned process, this known process does not permit an optimum utilization of the waste heat formed during the preparation process within the latter, because the CO-rich waste gas produced in the converter is not retained in the process and instead, after cleaning, is supplied to other uses where, apart from the necessary expenditure, losses necessarily occur.

In the process for heating an iron melt and the apparatus proposed for the same known from DE-A-27 37 441, a process or apparatus is involved for the superheating of an iron melt preferably produced from scrap and which during the local melting process separate from the superheating process is only heated to the vicinity of the liqudus point. The scrap used is heated up to fluidization by burners, which are located in the lower end section of a shaft furnace used as the melting vessel and flows from the same into a superheating vessel directly connected to the melting vessel and into whose baths are introduced by means of nozzles fuel and in particular solid coal, such as e.g. powdered coke and/or liquid hydrocarbon, as well as oxygen. From the superheating vessel, the steel produced is drawn off in ladles and is used as a charge material for converters for steel production.

In this known superheating process, heat production by the burners is to a certain extent aided by the heat capacity or content of the superheating chamber waste gases, which are introduced into the shaft furnace, give off their sensible heat and are burnt, the matching with the burners taking place in such a way that there is not an overheating. In this process, the latter must not take place in the melting furnace, because excessive oxidation would be feared. As the burners arranged at the lower end of the shaft furnace operate with air excess, there is necessarily at that point an at least partial, undesired conversion of CO into $CO_2$. The $CO_2$ on its path through the shaft furnace is once again at least in part reduced in an endothermic reduction to CO, accompanied by carbon consumption. Thus, the same occurs as in the process according to DE-A-32 19 984, in which the CO formed in the reactor is burnt to a considerable extent to $CO_2$ in the refining vessel, and consequently, accompanied by corresponding coke and heat consumption, the $CO_2$ is passed through the shaft half, is formed therein, initially followed by reduction to CO again and then once again by burning to $CO_2$. Thus, it is an apparatus-costly and process-non-optimum way for producing the charge material for converters.

The problem of the present invention is to improve the known processes and apparatuses, whilst avoiding the aforementioned and further disadvantages, in such a way that it is possible to produce therewith steel from scrap having a substantially random consistency with a minimum energy use and accompanied by the optimum utilization of the fuel (coke) used for the preparation process, in a continuous manner, without fusion of the scrap lumps occurring during the preheating of the scrap. Not only is there to be no restriction for the heat absorption from the available heat during preheating, but on a planned basis there is not only a melting to ust above the liquidus point, but also there is to be a superheating of the molten scrap, without there being an excessive oxidation of the iron to be refined.

To solve the process part of the aforementioned problem, the CO-rich converter waste gas formed during refining is supplied to the cupola furnace coke layer and is burnt in exothermic reaction in the vicinity of the cupola furnace tuyeres.

Although it is, inter alia, an objective of the present invention to keep the necessary energy use as low as possible and consequently use the coke employed in an energy-optimum manner for the preparation process, there is a process-unavoidable residual CO content necessary for obtaining a reducing atmosphere in the upper part of the scrap used in the waste gas to be removed from the cupola furnace, which is preferably kept constant and particularly at a value of approximately 8 to 14 vol. %, which can be brought about by a corresponding metering of the coke quantity added to the metal charge (scrap).

This measure is on the one hand based on the aforementioned idea that it is not possible to keep the waste gas escaping from the process completely CO-free, because the $CO_2$ formed during the combustion of the CO-rich waste gas formed during refining must give up its sensible heat to the scrap to be prepared prior to the escape from the preparation process and on its way to the cupola furnace gas necessarily meets carbon, which to a certain extent leads to a reaction to CO. On the other hand in the case of a non-reducing atmosphere the upper part of the scrap column, there would be a significant scrap oxidation, which would have a disadvantageous effect on the following metallurgical processes. If, by dosing the coke addition, the process sequence is controlled in such a way that the coke layer above the tuyeres does not become too large, so that e.g. there is a CO-content of the furnace gas to be removed from the preparation process of approximately 8 to 14 vol. %, then in a reducing atmosphere there is only a limited C-loss for the direct process and also a combustible furnace gas, whose heat content can be largely recovered and profitably used without any special complicated additional measures.

The converter waste gas formed during refining can be supplied to the porous coke layer in a direct counterflow to the molten pig iron flowing in during the refining process or through a connecting line (separate from the pig iron supply), which can lead e.g. from the converter in the vicinity of the tuyeres.

According to a special embodiment of the invention the oxygen is not supplied to the pig iron melt during refining by the introduction of air and instead the pig iron is refined in per se known manner with pure oxygen, in order to keep the waste gas quantity correspondingly small. In the case of such a procedure, when refining, it is possible to obtain a waste gas to be burned in the vicinity of the coke layer of the cupola furnace which contains up to 50% and possibly more CO, whilst the CO-content of the waste gas formed on refining with air would be less than half.

In a development of the inventive process, the slag formed or present during melting can be separated from the molten pig iron to be supplied to the refining process and only the molten pig iron is supplied to or subject to the refining process.

According to the invention, the apparatus solution of the above problem is that for transferring the molten pig iron, the lower end of the cupola furnace is connected to the converter and between the latter and the cupola furnace a connecting line is provided, for supplying to the cupola furnace coke layer the CO-rich waste gas formed in the converter during refining, so that it is burnt in exothermic reaction in the vicinity of the tuyeres. The CO-rich waste gas stream from the converter is not necessarily in a direct counterflow to the pig iron flowing from the cupola furnace into the converter and instead, according to a development of the invention, can be supplied by means of a separate connecting line to the cupola furnace area provided with the tuyeres, where it is burnt.

Thus, unlike in the aforementioned prior art, according to the invention the scrap to be prepared is not merely preheated with the converter waste gas and supplied still in lumpy form to the melt to be refined, but instead the scrap is melted in the cupola furnace and passes in molten from therefrom into the following converter without, even in the case of thin and thick scrap fragments of different consistency, the aforementioned difficulties occurring particularly in the transition phase from the solid into the plastic and in part molten stage through the fusion of the thin parts, lump formation, etc., because the porous coke bed of the conventional cupola furnace effectively prevents this. Thus, the metal constituents of the scrap becoming molten, located in the melting zone above the coke bed, in the case of the procedure according to the invention drip downwards through the coke bed, as known per se from conventional cupola furnace operation, whereas the waste gas formed in the converter, if it is not supplied to the cupola furnace via a separate connecting line, passes upwards through the coke bed and can be burnt in front of the tuyeres of the cupola furnace, so that the coke bed of the cupola furnace used in conjunction with a converter according to the invention simultaneously has a filtering action, which reliably prevents the difficulties occurring with the hitherto known scrap preheating with unlimited heat absorption.

The pig iron flowing to the converter and heated until it becomes molten in the cupola furnace on its way through the coke bed picks up carbon of about 3% and thereby forms the energy source for the following refining in the converter. However, the extremely CO-rich waste gas formed in the converter is not directly burnt in the latter accompanied by C-formation and instead it is only burnt in exothermic reaction in the vicinity of the cupola furnace tuyeres. Thus, accompanied by the optimum utilization of the coke used, it serves as an additional fuel and can supply the heat produced during burning without restriction to the scrap to be prepared. An unavoidable small residual CO-content passes out of the cupola furnace as furnace gas, but its CO-content is preferably controlled in such a way that it is ignitable and can be used for energy purposes in connection with afterburning in a recuperator.

According to the procedure according to the invention, no significant $CO_2$ fraction forms either in the converter or in the cupola furnace half region, so that the coke bed provided according to the invention is not "devoured" by the converter waste gas by giving off carbon, as is necessarily the case with CO-burning in the converter and the like or in the shaft furnace half in the hitherto proposed processes.

In order to be able to form the process sequence as accurately and as simply as possible and for this reason alone to keep the pig iron quantity subject to refining constant, the converter outlet for tapping off the refined steel from the converter can be constructed in the manner of a siphon, the outlet preferably being constructed in such a way that the pig iron quantity contained in the converter is determined by the weir height of the siphon. This procedure can also be adopted with respect to the converter outlet for draining off the slag.

As has already been stated hereinbefore in connection with the process measures, according to a development of the invention there need only be a single connection between the cupola furnace and the converter through which on the one hand pig iron and optionally slag can flow into the latter and on the other the converter waste gases produced during refining flow in counter current manner into the cupola furnace. However, according to a variant there can also be two connections between the cupola furnace and the converter the pig iron and optionally the slag, if the latter is not separated from the pig iron beforehand by a separating means, pass through a first connection into the converter, whilst the CO-rich waste gases formed during refining flow through a second connecting line from the converter to the cupola furnace.

The energy expenditure required when using the process according to the invention is particularly low, which is inter alia the objective of the present invention. The coke rate attainable in the case of a lined hot blast cupola is approximately 70 to 75 kg/t, whereas the conventional coke rates in lined operation in conventional cupola furnaces are approximately 100 to 110 kg/t. The difference between the practical coke rate and the coke rate necessary for melting must be allowed in order to cover from the carbon standpoint the carburization of the pig iron.

At the start of the preparation measure according to the invention for producing steel from scrap initially more coke is added than corresponds to the melting coke rate corresponding to continuous operation of e.g. approximately 70 kg/t and namely approximately 100 kg of coke/t, the difference of approximately 30 kg coke/t of scrap being used for carburizing the resulting pig iron by dissolving. This initial coke rate difference is mainly converted into CO during refining in the converter, and is consequently obtained in the inventive procedure as an additional fuel for the scrap to be prepared, so that on a long term in the aforementioned embodiment, i.e. after reaching the operational steady state condition, only approximately 70 kg/coke/t still has to be supplied.

The heat formed during refining of the pig iron can also be used for melting so-called additional scrap in the converter, and which is added to the latter if the operating temperature is to be kept substantially constant. As a function of the operational conditions an addition of additional scrap of up to 150 to 200 kg/t must be expected, for which no further energy use is required, so that the overall energy expenditure, ie. for melting the scrap in the cupola furnace and for the additional melting of scrap in the converter is approximately 70 kg/t and, also from energy standpoints, the invention provides an alternative particularly for steelworks equipped with arc furnaces, which already have high power prices due to the high melting costs and in future must expect even higher power prices and which are well above the melting costs to be expended in the procedure according to the invention.

Preferred embodiments of the present invention are described in the subclaims.

The invention is described in greater detail hereinafter relative to the diagrammatic, simplified drawing.

The drawing shows an apparatus according to the invention for the production of steel from scrap with a cupola furnace 1 having on its first furnace gas-containing upper section 2 a charging opening for the charge material consisting of scrap and coke. Roughly in the central section of cupola furnace 1, shaft 3 is surrounded concentrically in per se known manner, by a wind belt 4, from which tuyeres 6 pass through the shaft jacket below the wind belt 4 in the vicinity of a so-called superheating zone and below which in the furnace half is located the so-called collecting zone 7 from which emanates a taphole in the case of a separate use of such a cupola furnace, 1. Hole 8 is not closed in the apparatus shown in the drawing and instead passes by means of a connection 9 into an inlet 11 of a converter 12, so that the pig iron melted in cupola furnace 1 flows in accordance with arrows 13 from furnace 1 into converter 12, and forms there a bath consisting essentially of pig iron 14 and slag 16.

Converter 12 has an outlet 17 constructed as a siphon for the pig iron, as well as a siphon-like oulet 18 for slag 16, so that the maximum content of the converter is in each case limited by the weir height H or h and consequently the content of converter 12 is constant. An inspection opening 20 is positioned above outlet 17.

Converter 12 has at least one opening 19, through which oxygen can be passed from the outside in acordance with arrow 21 into the melt located in converter 12, in order to refine pig iron 14.

Finally, converter 12 has a charging opening 22 through which additional scrap and/or burnt lime can be fed into converter 12 from a storage bunker 23, so that the operating temperature in converter 12 or the basicity of the slag is kept substantially constant.

The converter waste gas formed during refining and essentially consisting of CO flows counter to arrows 13 from converter 12 into cupola furnace 1 and consequently passes through opening 8 and collecting zone 7, i.e. through the so-called furnace hearth to the coke bed located in furnace 1, which extends 1 to 2 m upwards and downwards from the tuyeres 6 and is consequently located between the already molten pig iron flowing to converter 12 and the not yet molten scrap located above it. Upstream of tuyeres 6, coke bed 24 has a temperature of approximately 2000 to 2500, so that the molten iron which, as a function of its content of C, Si, etc., has a much lower melting temperature, is superheated to approximately 1500° C. on its dripping path through the coke bed where it absorbs approximately 2 to 3% carbon, and in this superheated state passes into converter 12. However, the excessive iron oxidation feared by the prior art does not take place therein, because the iron oxide formed reacts with the abundantly present carbon to Fe and CO, the former running into converter 12 and the latter is burnt by tuyere 6 in furnace 1. As the CO-rich converter waste gas does not contain any significant $CO_2$ proportion, there is initially no reaction on flowing through coke bed 24. Only in the vicinity of tuyeres 6, is the converter waste gas burnt in exothermic reaction to $CO_2$ and mainly gives off the heat formed during the combustion process to the scrap to be melted, whose metal droplets formed during the melting and subsequent superheating process, accompanied by approximately 3% carburization, drip downwards through the coke beds which simultaneously acts as a filter and then pass out of the collecting zone 7 into converter 12 in accordance with arrows 13, whilst in counterflow, the CO-rich waste gas of converter 12 flows upwards through the coke bed.

It is not possible to avoid a certain reduction of the $CO_2$ formed at the tuyeres 6 during CO combustion during its rise in the furnace gas. In the represented embodiment, CO-proportion of the cupola furnace as is controlled at 12 vol. % by corresponding coke addition, so that the furnace gas leaving the cupola furnace in the direction of arrow 26 is combustible, and consequently is supplied by means of a not shown connecting means to a corresponding heat utilization area.

I claim:

1. A process for treating scrap utilizing a cupola furnace for producing molten pig iron from scrap and a converter connected to the cupola furnace downstream of the cupola furnace for refining molten pig iron, said furnace comprising tuyeres for supplying oxygen to the cupola furnace, said converter comprising means for supplying oxygen to molten pig iron in the converter, the process comprising:
    a. providing a layer of coke in the vicinity of the tuyeres;
    b. supplying a mixture of scrap and coke to the cupola furnace upstream of the layer of coke;
    c. heating the scrap to form molten pig iron;
    d. passing the molten pig iron to the converter through the layer of coke;
    e. refining the molten pig iron in the converter with oxygen, thereby producing a CO-rich converter waste gas;
    f. supplying the converter waste gas to the coke layer; and
    g. burning the converter waste gas exothermally in the vicinity of the tuyeres, thereby producing a cupola furnace waste gas.

2. The process according to claim 1, wherein the waste converter gas is supplied to the coke layer countercurrent to the molten pig iron flowing from the cupola furnace to the converter, and flows through the coke layer from bottom to top.

3. The process according to claim 1, wherein the converter waste gas is supplied to the coke layer separately from the molten pig iron flowing from the cupola furnace to the converter.

4. The process according to claim 1, wherein the CO-conent of the cupola furnace waste gas is kept substantially constant.

5. The process according to claim 4, wherein the CO-content of the cupola furnace waste gas is about 8–14% by volume.

6. The process according to claim 4, wherein the CO-content of the cupola furnace waste gas is maintained by metered addition of coke to the scrap used.

7. The processss according to claim 1, wherein substantially pure oxygen is used for refining the molten pig iron in the converter.

8. An apparatus for treating scrap, comprising:
    a. a cupola furnace for melting scrap to for molten pig iron, said cupola furnace comprising:
        tuyeres for supplying oxygen to the furnace; and
        a layer of coke in the vicinity of the tuyeres;
    b. means for supplying the cupola furnace with a mixture of scrap and coke upstream of the layer of coke;
    c. a converter for refining molten pig iron and thereby producing a CO-rich converter waste gas downstream of the cupola furnace, comprising means for supplying oxyen to molten pig iron in the converter;
    d. first connecting means downstream from the layer of coke for delivering molten pig iron to the converter; and
    e. means for delivering converter waste gas to the coke layer, to be burned exothermally in the vicinity of the tuyeres.

9. The apparatus according to claim 8, wherein the first connecting means forms the means for delivering.

10. The apparatus according to claim 8, wherein a second connecting means separate from the first connecting means forms the means for delivering.

11. The apparatus according to claim 8, wherein the converter comprises a first outlet for removing refined product from the converter and a second outlet for removing slag from the converter, at least one of said first and second outlets being formed as a siphon, the amount of material in the converter being determined by the weir height of the siphon.

12. The apparatus according to claim 8, wherein the cupola furnace further comprises means for separating slag from pig iron.

* * * * *